(12) United States Patent
Wang et al.

(10) Patent No.: US 7,713,917 B2
(45) Date of Patent: May 11, 2010

(54) THERMAL INSULATION COMPOSITIONS CONTAINING ORGANIC SOLVENT AND GELLING AGENT AND METHODS OF USING THE SAME

(75) Inventors: Xiaolan Wang, Spring, TX (US); Qi Qu, Spring, TX (US); Jeffrey C. Dawson, Conroe, TX (US); D. V. Satyanarayana Gupta, The Woodlands, TX (US)

(73) Assignee: BJ Services Company, Houston, TX (US)

( * ) Notice: Subject to any disclaimer, the term of this patent is extended or adjusted under 35 U.S.C. 154(b) by 896 days.

(21) Appl. No.: 11/429,759

(22) Filed: May 8, 2006

(65) Prior Publication Data

US 2007/0259791 A1 Nov. 8, 2007

(51) Int. Cl.
*C09K 8/60* (2006.01)
*C09K 8/10* (2006.01)
*C08F 20/56* (2006.01)

(52) U.S. Cl. .............. 507/261; 507/112; 525/329.4; 166/308

(58) Field of Classification Search .......... 507/261, 507/112; 525/329.4; 166/308
See application file for complete search history.

(56) References Cited

U.S. PATENT DOCUMENTS

| | | | |
|---|---|---|---|
| 4,258,791 A | 3/1981 | Brandt et al. | |
| 5,547,026 A | 8/1996 | Brannon et al. | |
| 5,566,760 A * | 10/1996 | Harris | 166/308.6 |
| 6,489,270 B1 | 12/2002 | Vollmer et al. | |
| 6,810,959 B1 | 11/2004 | Qu et al. | |
| 6,933,341 B2 * | 8/2005 | Dinh et al. | 524/775 |
| 7,306,039 B2 | 12/2007 | Wang et al. | |
| 2004/0059054 A1 | 3/2004 | Lopez et al. | |
| 2004/0072700 A1 | 4/2004 | Gupta et al. | |
| 2004/0138070 A1 * | 7/2004 | Jones et al. | 507/112 |
| 2005/0211435 A1 | 9/2005 | Monroe et al. | |
| 2006/0131536 A1 | 6/2006 | Qu et al. | |
| 2006/0211580 A1 | 9/2006 | Wang et al. | |

FOREIGN PATENT DOCUMENTS

| | | |
|---|---|---|
| EP | 0341976 A | 11/1989 |
| FR | 2532988 A1 | 3/1984 |

OTHER PUBLICATIONS

Fernandez, I.J.; "Evaluation of Cationic Water-Soluable Polymers with Improved Thermal Stability" (SPE 93003); Society of Petroleum Engineers Inc.; 2005 SPE International Symposium on Oilfield Chemistry; Feb. 2-4, 2005, Houston, Texas; pp. 1-13.

* cited by examiner

*Primary Examiner*—Timothy J. Kugel
*Assistant Examiner*—Atnaf Admasu
(74) *Attorney, Agent, or Firm*—Jones & Smith, LLP

(57) ABSTRACT

A thermal insulating composition containing an organic solvent of low thermal conductivity and a gelling agent hydratable in the solvent is useful for controlling heat transfer from a production tubing or transfer pipe in a wellbore to a surrounding annuli and/or the environment. Further, the composition is capable of reducing convection flow velocity within the annulus surrounding production tubing or a transfer pipe.

27 Claims, 2 Drawing Sheets

THERMAL INSULATION COMPOSITIONS CONTAINING ORGANIC SOLVENT AND GELLING AGENT AND METHODS OF USING THE SAME

FIELD OF THE INVENTION

This invention relates to enhancement of the thermal insulation of production tubing or a transfer pipe by use of a novel thermal insulating composition which controls the heat transfer from the tubing or pipe to one or more surrounding annuli and the environment. The fluid viscosity of the composition is capable of reducing the convection flow velocity within the surrounding annulus of the well or transfer pipe being treated.

BACKGROUND OF THE INVENTION

Undesired heat loss from production tubing as well as uncontrolled heat transfer to outer annuli can be detrimental to the mechanical integrity of outer annuli, because productivity losses from the well due to deposition of paraffin and asphaltene materials, accelerate the formation of gas hydrates, and destabilize the permafrost in arctic type regions. The successful use of wellbore insulation fluids in the past several years has demonstrated that such fluids, added either into annulus or riser, can effectively reduce undesired heat loss.

For instance, U.S. Pat. No. 6,489,270 discloses non-crosslinked insulating fluids which are easy to blend and pump into the annulus. Such fluids, when added either into an annulus or riser, effectively reduce undesired heat loss from the production tubing, or heat transfer to outer annuli.

Water-superabsorbent polymers are disclosed for use in gelled fluids as thermal insulating fluids in U.S. Patent Publication No. 20040059054. Such gelled fluids exhibited an inherently low thermal conductivity and the requisite viscosity. The fluid viscosity was generated by mixing the requisite amount, typically between from 0.1 to 10 weight percent, of polysaccharide into a brine system which may optionally contain a glycol, such as propylene glycol and a viscosifying polymer, such as carboxymethyl hydroxypropyl guar. The resulting fluid, which are easy to blend and pump at the rig site, reduces the heat loss from a hot annulus to a cold annulus by reducing the fluid thermal convection caused by the temperature differential between the high temperature environment of the inner annulus and low temperature environment of the outer annuli. Fluid thermal convection, which accounts for the major portion of the heat transfer, is dependent on the fluid viscosity and mobility of the solvent, such as a water-polyol mixture.

Alternative materials which are more effective in the retention of heat have been sought. Such materials are needed in order to improve the intrinsic thermal conductivity of the solvent system of insulation fluids.

SUMMARY OF THE INVENTION

The invention relates to a composition capable of controlling the heat transfer from a production tubing or transfer pipe to one or more surrounding annuli and the environment. The composition, which exhibits enhanced thermal control and which is particularly effective for deepwater risers, contains an organic solvent of low thermal conductivity and a gelling agent hydratable in the solvent. The composition is typically buffered to a pH above 10. The fluid viscosity of the composition is capable of reducing the convection flow velocity within the surrounding annulus of the well or a transfer pipe.

The organic solvent is preferably isopropanol or a polyol selected from ethylene glycol, propylene glycol, glycerol, butylene glycol, diethylene glycol and trimethylene glycol, polyethylene glycol, poly(1,3-propanediol), poly(1,2-propanediol), poly(1,2-butanediol), poly(1,3-butanediol), poly(1,4-butanediol), poly(2,3-butanediol), polyvinyl alcohol, copolymers and block polymers thereof. In a preferred embodiment, the organic solvent is ethylene glycol, propylene glycol, glycerol or diethylene glycol.

The gelling agent is preferably a synthetic polymer [such as polyacrylamide (like copolymers of acrylamide or (meth) acrylamide and N-vinylformamide, N-vinylacetamide, N-vinylcaprolactam, N-vinylimidazole, N-vinylpyridine, vinyl phosphonate, 2-acrylamido-2-methylpropanesulfonic acid, N-vinylpyrrolidone and/or acrylamidopropyltrimonium chloride] or a derivative thereof or a hydroxyalkylated guar (such as hydroxypropyl guar or modified hydroxypropyl guar) or a polyacrylic acid, salt or copolymer thereof [such as a polymer containing acrylic acid, methyl acrylate, ethyl acrylate, propyl acrylate, butyl acrylate, octyl acrylate, dodecyl acrylate, (meth)acrylic acid, methyl (meth)acrylate, ethyl (meth)acrylate, propyl (meth)acrylate, isopropyl (meth)acrylate and butyl (meth)acrylate or a hydrophobically-modified polyacrylic acid/acrylate copolymer.

In a preferred embodiment, the gelling agent is either a terpolymer of N-vinylformamide, 2-acrylamido-2-methylpropanesulfonic acid and acrylamide or a copolymer of 2-acrylamido-2-methylpropanesulfonic acid and acrylamide and, optionally, N-vinylpyrrolidone or a terpolymer of acrylamidopropyl trimonium chloride, acrylamide and a nitrogen heterocyclic monomer such as N-vinylformamide, N-vinylacetamide, N-vinylcaprolactam, N-vinylimidazole, N-vinylpyridine or N-vinylpyrrolidone or a hydrophobically-modified polyacrylic acid or acrylic acid/acrylate copolymer.

The compositions of the invention provide high viscosity at low shear rate range to reduce convection flow velocity within the annulus. In addition, the compositions of the invention provide lower viscosity at high shear rate range to facilitate the fluid placement.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

The composition of the invention is capable of reducing heat transfer from production tubing or a transfer pipe in a wellbore to the environment or surrounding annuli. The composition contains a solvent of low thermal conductivity and a viscosifying polymer or gelling agent hydratable in the solvent.

The solvent imparts low thermal conductivity to the composition and thereby provides highly desirable thermal insulation. Typically, the intrinsic thermal conductivity of the solvent is below 0.38 BTU/(hr-ft-° F.).

Preferred solvents include isopropanol, glycols such as ethylene glycol, propylene glycol, glycerol, butylene glycol, diethylene glycol and trimethylene glycol and such polyglycols as polyethylene glycol, poly(1,3-propanediol), poly(1,2-propanediol), poly(1,2-butanediol), poly(1,3-butanediol), poly(1,4-butanediol), poly(2,3-butanediol), copolymers, block polymers and mixtures of these polymers. The polyglycols typically have a molecular weight between from about 4,000 to about 6,000. In a preferred embodiment, the organic solvent is ethylene glycol, propylene glycol, glycerol and diethylene glycol.

Any gelling agent capable of being hydrated in the low thermal conductivity solvent is acceptable. The gelling agent is capable of rendering a viscosity of from about 100 to about 2000 cps@100 sec$^{-1}$ to the composition.

In a preferred embodiment, the gelling agent is a polyacrylamide or derivative thereof, preferably a copolymer of acrylamide or (meth)acrylamide or a hydrophobically-modified polyacrylic acid/acrylate copolymer. Suitable comonomers include N-vinylformamide, N-vinylacetamide, N-vinylcaprolactam, N-vinylimidazole, N-vinylpyridine, 2-acrylamido-2-methylpropanesulfonic acid, N-vinylpyrrolidone and acrylamidopropyltrimonium chloride. Typically, the copolymers are comprised of two distinct monomers in a 10:90 to 90:10 weight percent ratio of acrylamide to other comonomer.

Also preferred are polyacrylic acids, salts and copolymers thereof. Such polymers may be produced from at least one monomer selected from the group consisting of acrylic acid, (meth)acrylic acid, alkyl acrylate and alkyl (meth)acrylate such as methyl acrylate, ethyl acrylate, propyl acrylate, butyl acrylate, octyl acrylate, dodecyl acrylate, (meth)acrylic acid, methyl (meth)acrylate, ethyl (meth)acrylate, propyl (meth) acrylate, isopropyl (meth)acrylate, butyl (meth)acrylate and the like. For instance, the polymers may be acrylate copolymers of $C_1$-$C_{26}$-alkyl (meth)acrylate and (meth)acrylic acid as well as (meth)acrylic acid and at least two different $C_1$-$C_{26}$-alkyl (meth)acrylate monomers. Further, the polymers may be acrylate copolymers containing acrylamide or acrylonitrile. A particularly suitable acrylate copolymer dispersion is obtainable commercially under the designation Viscalex EM 15 (Ciba Specialty Chemicals).

Further preferred are hydrophobically-modified polyacrylic and acrylic/acrylate copolymers. Such polymers include Aculyn™ 28, a hydrophobically-modified alkali soluble emulsion (HASE), commercially available from Rohm and Haas Company. Such HASE products are disclosed in U.S. Pat. No. 6,063,857, herein incorporated by reference, and are neutralized emulsion polymers comprising from 30 to 75 parts by weight of nonionic monomer; from 5 to 75 parts by weight of anionic monomer; and from 1 to 20 parts by weight of hydrophobic monomer. The nonionic monomer may be a $C_1$-$C_7$ alkyl or $C_2$-$C_7$ hydroxyalkyl esters of acrylic and methacrylic acid including ethyl (meth)acrylate, methyl (meth)acrylate, 2-ethylhexyl acrylate, butyl (meth)acrylate, 2-hydroxyethyl acrylate and 2-hydroxybutyl methacrylate and the like. Preferred are ethyl (meth)acrylate, methyl (meth)acrylate, 2-ethylhexyl acrylate, butyl (meth) acrylate, 2-hydroxyethyl acrylate, and 2-hydroxybutyl methacrylate. More preferred are ethyl acrylate, methyl acrylate, and butyl acrylate. The anionic monomer is a monomer which contains a negative charge in a basic aqueous solution. Suitable anionic monomers include acrylic acid and methacrylic acid. Suitable hydrophobic monomers are surfactant esters such as $C_8$-$C_{30}$ alkylphenoxy (ethyleneoxy)$_{6-100}$ ethyl (meth) acrylates and $C_8$-$C_{30}$ alkoxy (ethyleneoxy)$_{6-50}$ ethyl (meth) acrylates; $C_8$-$C_{30}$ alkylphenoxy ethyl (meth)acrylates; and $C_8$-$C_{30}$ alkoxy ethyl (meth)acrylates. Hydrophobic monomers such as, but not limited to vinyl esters of $C_8$-$C_{30}$ carboxylic acid and $C_8$-$C_{30}$ alkyl esters of (methyl)acrylate can also be used. The amount of hydrophobic monomer as polymerized units in the HASE polymer is typically 1 to 20 parts by weight, preferably 1 to 15 parts by weight, more preferably 1 to 10 parts by weight. Suitable hydrophobic monomers include $C_{18}$-$C_{37}$ (EO)$_{20}$ (meth)acrylate and $C_{12}$-$H_{25}$ (EO)$_{23}$ (meth)acrylate.

Such polymers may be lightly crosslinked with a crosslinking agent, preferably those which contain two or more terminal polymerizable ethylenic groups per molecule. Examples of such crosslinking agents are N,N'-methylene-bis-acrylamide, N,N'-methylene-bis-(meth)acrylamide, diallyl amine, diallyl acrylamide, diallyl (meth)acrylamide, diallyl ether, diallyl methyl ether, divinyl benzene, diethylene glycol divinyl ether, ethylene glycol diacrylate, ethylene glycol di(meth) acrylate, propylene glycol diacrylate, propylene glycol di(meth)acrylate, diethylene glycol diacrylate, diethylene glycol di(meth)acrylate, tetraethylene glycol diacrylate, tetraethylene glycol di(meth)acrylate, allyl acrylate, allyl (meth)acrylate, trimethylolpropane diallyl ether, polyethylene glycol diallyl ether, trimethylolpropane triacrylate, trimethylolpropane tri(meth)acrylate, 1,6 hexanediol diacrylate, pentaerythritol triacrylate, glyceryl/propoxy triacrylate and the like. Preferred crosslinking agents are N,N'-methylene-bis-acrylamide, trimethylolpropandiallylether and polyethyleneglycol diallylether. The amount of crosslinking agent may be varied to suit specific requirements; the amount of crosslinking agent typically varying from about 0.03 to 5.0% (by weight based on monomer). The amount of crosslinking agent typically used is between from about 0.05 to 2.0% by weight of gelling agent.

Preferred copolymers are terpolymers of (i.) N-vinylformamide, (ii.) 2-acrylamido-2-methypropanesulfonic acid and (iii.) acrylamide, optionally crosslinked, as well as copolymers of 2-acrylamido-2-methylpropanesulfonic acid and acrylamide, and optionally, N-vinylpyrrolidone and terpolymers of acrylamidopropyl trimonium chloride, acrylamide and a nitrogen heterocyclic monomer selected from the group consisting of N-vinylformamide, N-vinylacetamide, N-vinylcaprolactam, N-vinylimidazole, N-vinylpyridine and N-vinylpyrrolidone. Typically, each of the monomers in the terpolymers is present in an amount from about 5 to about 90 weight percent.

In a most preferred embodiment, the copolymer contains about 30 weight percent of 2-acrylamido-2-methylpropanesulfonic acid, 15 weight percent of N-vinylformamide and 54.5 weight percent acrylamide and has been crosslinked with about 0.5 weight percent of a crosslinking agent of trimethylolpropane diallylether or polyethyleneglycol diallylether.

Further preferred are guar derivatives, such as hydoxyalkylated guars like hydroxypropyl guar, hydroxyethyl guar and hydroxybutyl guar and modified hydroxyalkylated guars like carboxymethylhydroxypropyl guar, preferably those having a molecular weight of about 1.0 to about 3 million and wherein the molar substitution (defined as the number of moles of hydroxyalkyl groups per mole of anhydroglucose) is between from about 0.80 to about 1.20.

The composition is preferably buffered, in order to improve thermal stability and prevent polymer degradation, to a pH above 10. Suitable buffering agents known in the art, such as potassium carbonate and potassium bicarbonate, primary amine compounds are acceptable. Typically, the amount of buffer used in the composition is less than about 0.02 weight percent.

The composition of the invention may further contain a biocide and/or corrosion inhibitor. Further, the composition may contain a crosslinking agent and clay and clay-like materials to impart enhanced viscosity to the composition. Materials suitable for use in the invention are those known in the art and are employed in amounts recognized in the art.

In a preferred embodiment of the present invention, the thermal insulating fluid is substantially free of water. As such, the insulating fluid of the invention exhibits superior insulation properties and may be formulated by using between from about 0.05 to about 20%, preferably about 1%, by weight of copolymer based on 100% by volume of solvent. A preferred formulation for use in the invention contains close to 100 volume percent of propylene glycol as solvent and 4 pound/barrel of gelling agent.

While water is preferably not used in conjunction with the solvent, water (including saturated or unsaturated brine) may be used in small amounts in the composition, such as a portion of a crosslinking system and/or buffer. The amount of water (brine) in the thermal insulating composition of the invention is typically no greater than about 25 volume percent. By saturated brine, it is understood that the brine is saturated with at least one salt, such as sodium bromide.

The thermal insulating compositions of the invention may further contain a crosslinking metal-releasing agent. As used herein, the term "crosslinking metal-releasing agent" is taken to designate those metal or metal containing materials which will provide a metal ion or metal containing species in the solution capable of crosslinking the viscosifying polymer.

The crosslinking agent preferably comprises a borate ion releasing compound, an organometallic or organic complexed metal ion comprising at least one transition metal or alkaline earth metal ion as well as mixtures thereof, such as Zr (IV) and Ti (IV). Typically, the crosslinking agent is employed in the composition in a concentration of from about 0.001 percent to about 2 percent, preferably from about 0.005 percent to about 1.5 percent, and, most preferably, from about 0.01 percent to about 1.0 percent.

Borate ion releasing compounds which can be employed include, for example, any boron compound which will supply borate ions in the composition, for example, boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. 3,058,909 and U.S. Pat. No. 3,974,077 herein incorporated by reference. In addition, such borate ion releasing compounds include boric oxide (such as selected from $H_3BO_3$ and $B_2O_3$) and polymeric borate compounds. An example of a suitable polymeric borate compound is a polymeric compound of boric acid and an alkali borate which is commercially available under the trademark POLYBOR® from U.S. Borax of Valencia, Calif. Mixtures of any of the referenced borate ion releasing compounds may further be employed. Such borate-releasers typically require a basic pH (e.g., 7.0 to 12) for crosslinking to occur.

Further preferred crosslinking agents are reagents, such as organometallic and organic complexed metal compounds, which can supply zirconium IV ions such as, for example, zirconium lactate, zirconium lactate triethanolamine, zirconium carbonate, zirconium acetylacetonate and zirconium diisopropylamine lactate; as well as compounds that can supply titanium IV ions such as, for example, titanium ammonium lactate, titanium triethanolamine, and titanium acetylacetonate. Zr (IV) and Ti (IV) may further be added directly as ions or oxy ions into the composition.

Such organometallic and organic complexed metal crosslinking agents containing titanium or zirconium in a +4 valence state include those disclosed in British Pat. No. 2,108,122, herein incorporated herein by reference, which are prepared by reacting zirconium tetraalkoxides with alkanolamines under essentially anhydrous conditions. Other zirconium and titanium crosslinking agents are described, for example, in U.S. Pat. Nos. 3,888,312; 3,301,723; 4,460,751; 4,477,360; Europe Pat. No. 92,755; and U.S. Pat. No. 4,780,223, all of which are herein incorporated by reference. Such organometallic and organic complexed metal crosslinking agents containing titanium or zirconium in a +4 oxidation valance state may contain one or more alkanolamine ligands such as ethanolamine (mono-, di- or triethanolamine) ligands, such as bis(triethanolamine)bis(isopropol)-titanium (IV). Further, the compounds may be supplied as inorganic oxides, such as zirconium or titanium dioxide. Such crosslinking agents are typically used at a pH also in the range from about 6 to about 13.

Any suitable crosslinking metal ion, metal containing species, or mixture of such ions and species may further be employed. In a preferred embodiment, the crosslinking agent for use in the thermal insulating composition of the invention are reagents capable of providing Zn (II), calcium, magnesium, aluminum, Fe (II), and Fe (III) to the composition. These may be applied directly to the composition as ions or as polyvalent metallic compounds such as hydroxides and chlorides from which the ions may be released.

The crosslinking ions or species may be provided, as indicated, by dissolving into the solution compounds containing the appropriate metals or the metal ion per se. The concentration of crosslinking agent is dependent on factors such as the temperature in the annuli and will normally range from about 5 ppm to about 2000 ppm, preferably from about 100 ppm to about 900 ppm. When desired, crosslinking typically occurs after the thermal insulating composition is within the annuli.

Zirconium crosslinkers, such as those described in British Pat. No. 2,108,122, are a preferred class of crosslinkers for use herein. Such crosslinkers are preferred because of their "delayed" or "retarded" crosslinking reactivity. This delayed activity is useful because it lets the operator formulate and pump the uncrosslinked composition while it has a relatively lower viscosity which means easier pumping. The delayed systems are usually designed to crosslink while the fluid is being pumped through the wellbore tubing and/or as the fluid enters into the annuli.

The thermal insulating composition of the invention is prepared on the surface and then pumped through tubing in the wellbore or in the annulus. In a preferred embodiment, the fluid is a packer or riser fluid and the packer fluid is introduced above the packer in an annulus and the riser fluid is introduced into a riser annulus.

While high viscosity, thickened fluid is highly desirable after the fluid is positioned in the annulus, large amounts of energy are required to pump such fluids through tubing and annular spaces. Crosslinking, when desired, may be delayed, thereby reducing the amount of energy required to pump viscous fluids through the tubing by permitting pumping of a relatively less viscous fluid having relatively low friction pressures within the well tubing. Crosslinking is typically affected when the fluid is placed in the annulus after which the advantageous properties of thickened crosslinked fluid are then available for thermal insulation.

The composition, when pumped into an annuli surrounding the production tubing or transfer piping, enhances the thermal insulating quality around the tubing or piping, thereby reducing heat loss from it. The composition further provides high viscosity at low shear rate so as to reduce the rate of fluid convection to near zero. Since convection is fluid motion caused by the variation of fluid density with temperature, increasing fluid viscosity decreases fluid motion, and correspondingly, decreases free annular convection. Thus, the desired Theological profile for the insulating fluid of the invention includes high viscosity at low shear rate in order to reduce the free fluid convection caused by temperature differential. Additionally, a low viscosity at high shear rate is desired to facilitate the placement of the insulating fluid at the desired location.

The thermal insulating composition of the invention may be produced in shore-based facilities, transported to, and pumped from marine well-servicing boats into riser annuli. This provides a convenient means to blend, temporarily store, and then pump large quantities of fluid into the wellbore and riser annuli, without using rig tanks.

The thermal insulating composition of the invention further offers environmental benefits since no oil sheen will be produced if the composition is spilled since the composition is oil-free. Further, while the fluid compositions vary according to specific well conditions, the components of the composition are environmentally friendly especially since the composition is solids-free.

The composition of the invention may serve a dual purpose. First, they serve to prevent heat transfer/buildup in the outer annuli. Second, they serve to retain heat within the produced hydrocarbons. The compositions further provide lower viscosity at high shear rate to facilitate the fluid placement.

The following examples will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

Unless stated to the contrary, all percentages expressed herein, refer to weight percentage.

The following abbreviations are further used:

CMHPG refers to carboxymethyl hydroxypropyl guar;

HE-100 refers to a copolymer of 2-acrylmideo-2-methyl-propanesulfonic acid and acrylamide, a product of Drilling Specialty Company;

HE-300 refers to a terpolymers of 2-acrylamido-2-methylpropane sulfonic acid, acrylamide and N-vinylpyrrolidone, commercially available from Drilling Specialty Company;

GM-60 refers to a modified hydroxypropyl guar, a product of BJ Services Company;

Non-crosslinked insulating fluid or ATIF, disclosed in U.S. Patent Application No. 20040059054, consists of 4 pound per barrel (ppb) of CMHPG, and 2 ppb of superabsorbent polymer G-504 (a Water Lock product from Grain Processing Corp., Muscatine, Iowa) respectively, to 9.0 ppg brine, the brine consisting of water, propylene glycol (25 volume %), and sodium bromide salt.

Example 1

Example 1 Examines the Rheology of Insulating Fluids of the Invention 4 g of HE-100 was added to 350 mls of propylene glycol while stirring. After hydrating the mixture by mechanical stirring for 30 minutes and adjusting the pH above 10.0 with $K_2CO_3$, a 50 ml sample of the hydrated fluid was placed into a Fann 50° C. viscometer cup. The cup was then placed on a Fann 50° C. viscometer and pressured to about 300 psi (14 $kg/cm^2$) with nitrogen. The sample was then sheared at 100 $sec^{-1}$ for 28 minutes at 120° F., followed by a rate sweep using 100, 75, 50, and 25 $sec^{-1}$ for about 2 minutes. The oil bath temperature was pre-set to 49° C. and the bath was raised to submerge the sample cup. The rate sweep was repeated every 28 minutes, and the interim rate between sweeps was 100 $sec^{-1}$. The stresses associated to each rate used in the sweep together with the rates were used to calculate the power law indices n and K; wherein n refers to flow behavior index and K refers to consistency index set forth in the American Petroleum Institute's Bulletin RP-39. The fluid viscosity was then calculated by using the n and K values, as set forth in Table I:

TABLE I

| Time Minute | Temperature ° F. | n | K mPa·s$^n$ | Rate 1 40/second Viscosity 1 CentiPoise | Rate 2 100/second Viscosity 2 CentiPoise | Rate 3 170/second Viscosity 3 CentiPoise |
|---|---|---|---|---|---|---|
| 4 | 75 | 0.4988 | 0.1497 | 1221 | 771 | 591 |
| 32 | 120 | 0.4738 | 0.1057 | 787 | 486 | 368 |
| 60 | 120 | 0.4509 | 0.1073 | 736 | 445 | 332 |
| 88 | 120 | 0.4457 | 0.1086 | 731 | 440 | 328 |
| 116 | 120 | 0.4477 | 0.1091 | 739 | 446 | 332 |
| 143 | 120 | 0.4460 | 0.1105 | 744 | 448 | 334 |

The run was then repeated except that 8 g of HE-300 was used in place of the 4 g of HE-100 used in Example 1. The HE-100 was then added to 350 milliliters of propylene glycol. The rheological profile is set forth in Table II:

TABLE II

| Time Minute | Temperature °F. | n | K mPa·s$^n$ | Rate 1 40/second Viscosity 1 CentiPoise | Rate 2 100/second Viscosity 2 CentiPoise | Rate 3 170/second Viscosity 3 CentiPoise |
|---|---|---|---|---|---|---|
| 4 | 75 | 0.4791 | 0.3308 | 2511 | 1558 | 1182 |
| 32 | 120 | 0.4885 | 0.2250 | 1767 | 1106 | 843 |
| 60 | 120 | 0.4828 | 0.2128 | 1637 | 1019 | 775 |
| 88 | 120 | 0.4812 | 0.2130 | 1630 | 1013 | 769 |
| 116 | 120 | 0.4800 | 0.2163 | 1647 | 1023 | 776 |
| 143 | 120 | 0.4791 | 0.2181 | 1656 | 1027 | 779 |

Tables I and II illustrate thermal insulating fluids of high viscosity for use as thermal insulating fluids and, as reflected by the value for n. Tables I and II show that the insulating fluids of the invention exhibit an acceptable viscosity profile while using pure organic solvent to hydrate the polymer.

The rheological properties of the insulating fluids may be adjusted by altering the concentration of polymer in order to provide a convenient means to blend, temporarily store, and then pump large quantities of fluid into the wellbore and riser annuli, without using rig tanks.

Example 2

Figure 1:
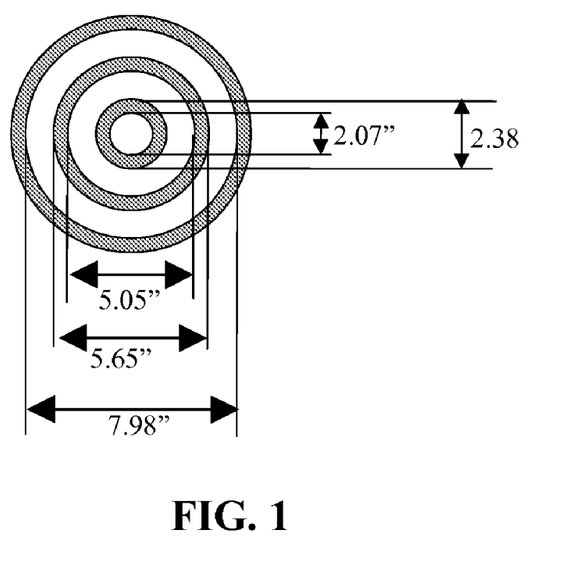
FIG. 1 illustrates the concentric tube dimensions for a heat transfer apparatus used to determine the thermal insulation effectiveness of exemplified fluids.

Example 2 Examines the Thermal Insulation Effectiveness of Certain Fluids Using Laboratory-Sized Heat Transfer Apparatus Two fluids were prepared in accordance with the procedure of Example 1 but using 4 lbs/barrel GM-60 and 4 lbs/barrel HE-100. The thermal insulating properties of thermal insulating fluids were evaluated in a laboratory-sized heat transfer apparatus to determine the thermal effectiveness of the fluids. These fluids were contrasted with pure solvent and ABIF. The heat transfer apparatus consisted of three concentric aluminum pipes connected and sealed by two flanges. The physical dimensions are shown in FIG. 1. Hot fluid at constant temperature was circulated in the inner pipe, while cold fluid at constant temperature was circulated in the outer annulus. The test insulating-fluid was contained in the annulus between the hot and cold reference fluids. The top and bottom of the apparatus were insulated to assure that heat flow was in the radial direction.

About 7000 ml of the fluid was placed into the annulus of a laboratory-sized heat transfer apparatus for the test on each fluid. Hot fluid was allowed to enter the inner pipe at the bottom and leave the pipe at the top at approximately 0.3-1 gallon/minute and thus provided a hot surface at the inner annulus wall. The cold water was fed to the outside pipe of the heat transfer apparatus with a flow rate of 3 gallon/minute to provide a cold wall annulus adjacent to the packer annulus. The test insulating-fluid remained static in the packer annulus. Thermocouples were positioned on the inner wall (hot surface) and outer wall (cold surface) of the annulus, and at the inlet and outlet ports for the hot and cold flowing water.

During the test, hot water and cold water temperatures were set at 180° F. and 50° F., respectively. After thermal equilibrium was achieved (2 to 3 hours) for a given test, data was collected to calculate heat transfer coefficient and apparent thermal conductivity and summarized in Table III:

TABLE III

| | U (heat transfer coefficient) BTU/hr·ft$^2$·°F. | K (effective thermal conductivity) BTU/hr·ft·°F.) |
|---|---|---|
| Solvent | 29.88 | 3.34 |
| ATIF | 2.76 | 0.308 |
| GM-60 Fluid | 1.97 | 0.221 |
| HE-100 Fluid | 1.389 | 0.155 |

Table III illustrates that the inventive fluid systems exhibit better thermal insulating properties than the fluids of the prior art.

Example 3

Example 3 Illustrates the Effect of Propylene Glycol Concentrations on the Insulating Behavior of the Insulating Fluids 91.4 g of a specialized hydroxypropyl guar, commercially available as GM-60 from BJ Services Company, was added to 8,000 mls. of a mixture of propylene glycol and sodium bromide brine (density of 1.5g/ml) in different ratios under rapid agitation.

After hydrating the mixture using a mechanical stirrer for 30 minutes and adjusting the pH in excess of 10.0 with $K_2CO_3$, the prepared thermal insulating fluids were transferred in a laboratory-sized heat transfer apparatus as described in Example 2 to determine the thermal insulating effectiveness of the fluids.

During the test, hot water and cold water temperatures were set at 180° F. and 50° F., respectively. After thermal equilibrium was achieved (2 to 3 hours) for a given test, data was collected to calculate heat transfer coefficient and apparent thermal conductivity and summarized in Table IV:

TABLE IV

| Fluid | volume percentage of propylene glycol in the fluid | U (heat transfer coefficient) BTU/hr·ft$^2$·°F. | K (effective thermal conductivity) BTU/hr·ft·°F.) |
|---|---|---|---|
| #1 | 100 | 1.97 | 0.221 |
| #2 | 75 | 2.28 | 0.255 |
| #3 | 50 | 2.45 | 0.273 |
| #4 | 25 | 3.30 | 0.370 |

Example 4

Example 4 Examines the Long-Term Thermal Stability of the Insulating Fluids 4 g of a GM-60 was added to 350 mls. of propylene glycol while stirring. After hydrating the mixture using a mechanical stirrer for 30 minutes and adjusting the pH to be an excess of 10.0 with $K_2CO_3$, the hydrated fluid was placed into a Fann 35 viscometer cup. The cup was then placed on a Farm 35 viscometer. The sample was sheared by a rate sweep using 3, 6, 100, 200, 300, 600 RPM. The fluid viscosity was then calculated by the readings on the Fann 35 viscometer. After taking the initial viscosity, this sample was placed in a glass jar and into a 180° F. static oven for a long-term thermal stability test. The sample was taken out from the oven to check the rheology at the 3 month and 6 month intervals. The rheological properties are listed in Table V.

TABLE V

Viscosity (cp) of the Invented Insulating Fluid

| Super absorbency Polymer | Shear Rate (RPM) | | | | | |
|---|---|---|---|---|---|---|
| | 3 | 6 | 100 | 200 | 300 | 600 |
| Initial | 35 | 45 | 160 | 238 | 285 | Off scale |
| 3 months | 38 | 49 | 175 | 250 | 300 | Off scale |
| 6 months | 30 | 44 | 183 | 274 | Off scale | Off scale |

Example 5

Example 5 Examines the Heat-Retention Ability of the Insulating Fluid of this Invention Versus an Insulating Fluid of the Prior Art by the Cool-Down Curves to Mimic the Shut-In Conditions of a Producing Well The test was performed in a laboratory-sized heat transfer apparatus to determine the thermal effectiveness of the fluids. The heat transfer apparatus consisted of three concentric aluminum pipes connected and sealed by two flanges. The physical dimensions are shown in FIG. 1. Hot fluid at constant temperature was circulated in the inner pipe, while cold fluid at constant temperature was circulated in the outer annulus. The test insulating-fluid was contained in the annulus between the hot and cold reference fluids. The top and bottom of the apparatus were insulated to assure that heat flow was in the radial direction. Hot water was permitted to enter the inner pipe at the bottom and leave the pipe at the top at approximately 1 gallon/minute to provide a hot surface at the inner annulus wall. The cold water was fed to the outside pipe of the heat transfer apparatus with a flow rate of 3 gallon/minute to provide a cold wall annulus adjacent to the packer annulus. The test insulating-fluid remained static in the packer annulus. Thermocouples were positioned on the inner wall (hot surface) and outer wall (cold surface) of the annulus, and at the inlet and outlet ports for the hot and cold flowing water.

Figure 2:
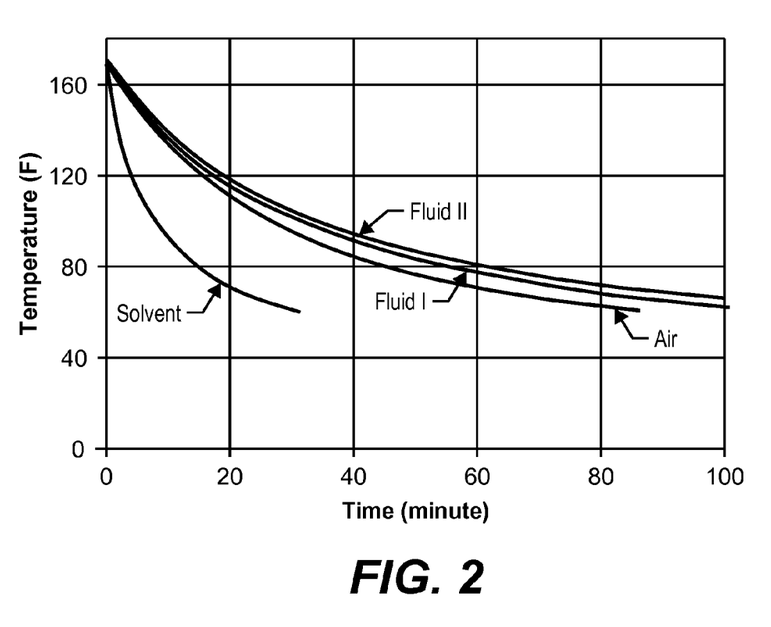
FIG. 2 illustrates heat retention ability exhibited by the thermal insulating fluid of the invention (Fluid II) versus an insulating fluid of the prior art (Fluid I), as discussed below in Example 5.

During the test, hot water and cold water temperatures were set at 180° F. and 50° F., respectively. After thermal equilibrium was achieved (2 to 3 hours) for a given test, hot water flow was stop and all hot water valves were closed. Cool down data was collected until the hot water temperature dropped below 60° F. FIG. 2 illustrates cool down results for insulting fluids in comparison with brine (solvent) and air. Taking cool-down to 80° F. for example, it took 15 minutes to drop to 80° F. when the insulating material was brine (solvent), 45 minutes for air, 52 minutes for the fluids of the prior art (Fluid I), and 60 minutes for the fluid of current invention (Fluid II). FIG. 2, therefore, demonstrates that in well shut-in situations using the inventive fluid systems retained heat better than the inventive fluid systems of the prior art.

From the foregoing, it will be observed that numerous variations and modifications may be effected without departing from the true spirit and scope of the novel concepts of the invention.

What is claimed is:

1. A thermal insulating composition useful for controlling heat transfer from a production tubing or transfer pipe in a wellbore to one or more surrounding annuli and/or the environment, the composition comprising an organic solvent of low thermal conductivity and a gelling agent hydratable in the solvent, wherein the gelling agent is selected from the group consisting of (i) hydrophobically-modified polyacrylic and acrylic/acrylate copolymers; (ii) terpolymers of acrylamide or (meth)acrylamide, 2-acrylamido-2-methylpropanesulfonic acid and N-vinylformamide; and (iii) terpolymers of acrylamidopropyl trimonium chloride, acrylamide or (meth) acrylamide and at least one comonomer selected from the group consisting of N-vinylformamide, N-vinylacetamide, N-vinylcaprolactam, N-vinylimidazole, N-vinylpyridine, N-vinylpyrrolidone and acrylamidopropyltrimonium chloride; and further wherein the fluid viscosity of the composition is capable of reducing the convection flow velocity within the surrounding annulus of the well or the production tube and/or transfer pipe.

2. The thermal insulating composition of claim 1, wherein the organic solvent is isopropanol or a polyol.

3. The thermal insulating composition of claim 2, wherein the organic solvent is selected from the group consisting of ethylene glycol, propylene glycol, glycerol, butylene glycol, diethylene glycol and trimethylene glycol, polyethylene glycol, poly(1,3-propanediol), poly(1,2-propanediol), poly(1,2-butanediol), poly(1,3-butanediol), poly(1,4-butanediol), poly(2,3-butanediol), polyvinyl alcohol, copolymers, block polymers and mixtures thereof.

4. The thermal insulating composition of claim 3, wherein the organic solvent is selected from the group consisting of ethylene glycol, propylene glycol, glycerol and diethylene glycol.

5. The thermal insulating composition of claim 1, wherein the gelling agent is capable of rendering a viscosity of from about 100 to about 2000 cps @100 $sec^{-1}$ at 25° C. to the composition.

6. The thermal insulating composition of claim 1, wherein the gelling agent is a hydrophobically modified polyacrylic acid or acrylic acid/acrylate copolymer.

7. The thermal insulating composition of claim 6, wherein the gelling agent is a hydrophobically modified polyacrylic acid/acrylate copolymer derived from at least one acrylate selected from the group consisting of an alkyl acrylate and an alkyl (meth)acrylate.

8. The thermal insulating composition of claim 7, wherein the gelling agent is a hydrophobically modified polyacrylic acid/acrylate copolymer derived from at least one acrylate selected from the group consisting of methyl acrylate, ethyl acrylate, propyl acrylate, butyl acrylate, octyl acrylate, dodecyl acrylate, (meth)acrylic acid, methyl (meth)acrylate, ethyl (meth)acrylate, propyl (meth)acrylate, isopropyl (meth)acrylate and butyl (meth)acrylate.

9. The thermal insulating composition of claim 8, wherein the gelling agent is a hydrophobically modified polyacrylic acid/acrylate copolymer of $C_1$-$C_{26}$-alkyl (meth)acrylate and (meth)acrylic acid and at least two different $C_1$-$C_{26}$-alkyl (meth)acrylate monomers.

10. The thermal insulating composition of claim 6, wherein the hydrophobically modified copolymer is a polyacrylic acid/acrylate copolymer derived from at least one member selected from the group consisting of $C_1$-$C_7$ alkyl or $C_2$-$C_7$ hydroxyalkyl esters of acrylic and methacrylic acid, $C_8$-$C_{30}$ alkylphenoxy (ethyleneoxy)$_{6-100}$ ethyl (meth)acrylates and $C_8$-$C_{30}$ alkoxy (ethyleneoxy)$_{6-50}$ ethyl (meth)acrylates; $C_8$-$C_{30}$ alkylphenoxy ethyl (meth)acrylates; and $C_8$-$C_{30}$ alkoxy ethyl (meth)acrylates, vinyl esters of $C_8$-$C_{30}$ carboxylic acid and $C_8$-$C_{30}$ alkyl esters of (methyl)acrylates.

11. The thermal insulating composition of claim 10, wherein the hydrophobically modified copolymer is a polyacrylic acid/acrylate copolymer derived from at least one member selected from the group consisting of ethyl (meth) acrylate, methyl (meth)acrylate, 2-ethylhexyl acrylate, butyl (meth)acrylate, 2-hydroxyethyl acrylate, and 2-hydroxybutyl methacrylate.

12. The thermal insulating composition of claim 1, wherein the amount of gelling agent present in the composition is between from about 0.05 to about 20 percent by weight based on 100 percent by volume of organic solvent.

13. The thermal insulating composition of claim 1, wherein the composition is buffered to a pH above 10.

14. A method for enhancing the thermal insulation of a production tubing or transfer pipe surrounded by at least one annuli, comprising:
   adding the fluid composition of claim 1 to the at least one annuli; and
   reducing the convection flow velocity within the surrounding annulus of the well or the production tube and/or transfer pipe.

15. The method of claim 14, wherein the gelling agent is either (i) a hydrophobically-modified polyacrylic and acrylic/acrylate copolymer; or (ii) a modified hydroxyalkylated guar derivative having a molecular weight between from about 1.0 to about 3 million and a molar substitution between from about 0.80 to about 1.20.

16. A method for reducing convection flow velocity in at least one annuli surrounding a production tubing or transfer pipe, comprising:
   introducing into the at least one annuli an insulating packer or riser fluid comprising the fluid composition of claim 1; and
   maintaining the fluid in the at least one annuli until the convection flow velocity is reduced.

17. The method of claim 16, wherein the fluid composition is a packer or riser fluid and further wherein the packer fluid is introduced above the packer in an annulus and the riser fluid is introduced into a riser annulus.

18. The thermal insulating composition of claim 1, wherein the gelling agent is a terpolymer of N-vinylformamide, 2-acrylamido-2-methylpropanesulfonic acid and acrylamide.

19. The thermal insulating composition of claim 1, wherein the gelling agent is a terpolymer of acrylamidopropyl trimonium chloride, acrylamide and a nitrogen heterocyclic monomer selected from the group consisting of N-vinylformamide, N-vinylacetamide, N-vinylcaprolactam, N-vinylimidazole, N-vinylpyridine and N-vinylpyrrolidone.

20. The thermal insulating composition of claim 1, wherein the thermal insulating composition is substantially free of water.

21. A thermally insulating composition useful for controlling heat transfer from a production tubing or transfer pipe in a wellbore to one or more surrounding annuli and/or the environment, the composition comprising an organic solvent of low thermal conductivity and a gelling agent hydratable in the solvent, wherein the gelling agent is selected from the group consisting of (i) hydrophobically-modified polyacrylic and acrylic/acrylate copolymers; (ii) modified hydroxyalkylated guars having a molecular weight of between from about 1.0 to about 3 million and a molar substitution between from about 0.80 to about 1.20; and (iii) terpolymers of acrylamide or (meth)acrylamide, 2-acrylamido-2-methylpropanesulfonic acid and at least one comonomer selected from the group consisting of N-vinylformamide, N-vinylacetamide, N-vinylcaprolactam, N-vinylimidazole, N-vinylpyridine, and N-vinylpyrrolidone and acrylamidopropyltrimonium chloride; and further wherein the fluid viscosity of the composition is capable of reducing the convection flow velocity within the surrounding annulus of the well or the production tube and/or transfer pipe, wherein the composition is substantially free of water.

22. The thermal insulating composition of claim 21, wherein the gelling agent is a modified hydroxyalkylated guar having a molecular weight of between from about 1.0 to about 3 million and a molar substitution between from about 0.80 to about 1.20.

23. The thermal insulating composition of claim 22, wherein the modified hydroxyalkylated guar is carboxymethylhydroxypropyl guar.

24. The thermal insulating composition of claim 21, wherein the gelling agent is a terpolymer of acrylamide or (meth)acrylamide, 2-acrylamido-2-methylpropanesulfonic acid and a nitrogen heterocyclic monomer selected from the group consisting of N-vinylformamide, N-vinylacetamide, N-vinylcaprolactam, N-vinylimidazole, N-vinylpyridine and N-vinylpyrrolidone and acrylamidopropyltrimonium chloride.

25. The thermal insulating composition of claim 24, wherein the gelling agent is a copolymer of 2-acrylamido-2-methylpropanesulfonic acid, acrylamide and N-vinylpyrrolidone.

26. The thermal insulating composition of claim 21, wherein the hydrophobically modified copolymer is a polyacrylic acid composed of acrylic acid or (meth)acrylic acid or a combination thereof.

27. A thermal insulating composition useful for controlling heat transfer from a production tubing or transfer pipe in a wellbore to one or more surrounding annuli and/or the environment, the composition comprising:
   (a) an organic solvent selected from the group consisting of isopropanol, ethylene glycol, propylene glycol, glycerol, butylene glycol, diethylene glycol and trimethylene glycol, polyethylene glycol, poly(1,3-propanediol), poly(1,2-propanediol), poly(1,2-butanediol), poly(1,3-butanediol), poly(1,4-butanediol), poly(2,3-butanediol), polyvinyl alcohol, copolymers, block polymers and mixtures thereof;
   (b) a gelling agent hydratable in the organic solvent and selected from the group consisting of (i) hydrophobically-modified polyacrylic and acrylic/acrylate copolymers; (ii) modified hydroxyalkylated guars having a molecular weight of between from about 1.0 to about 3 million and a molar substitution between from about 0.80 to about 1.20; and (iii) terpolymers of acrylamide or (meth)acrylamide, 2-acrylamido-2-methylpropanesulfonic acid and at least one comonomer selected from the group consisting of N-vinylformamide, N-vinylacetamide, N-vinylcaprolactam, N-vinylimidazole, N-vinylpyridine, N-vinylpyrrolidone and acrylamidopropyltrimonium chloride
wherein the thermal insulating composition is substantially free of water and further wherein the fluid viscosity of the thermal insulating composition is capable of reducing the convection flow velocity within the surrounding annulus of the well or the production tube and/or transfer pipe.

* * * * *